(12) United States Patent
Pandi et al.

(10) Patent No.: US 10,216,465 B2
(45) Date of Patent: Feb. 26, 2019

(54) METHODS AND SYSTEMS TO INTEGRATE DOCUMENT PRINTING AND SCANNING OPERATIONS

(71) Applicant: XEROX CORPORATION, Norwalk, CT (US)

(72) Inventors: Maharajan Maruthu Pandi, Madurai (IN); Pradeep Kumar Vijayakumar, Chennai (IN)

(73) Assignee: Xerox Corporation, Norwalk, CT (US)

( * ) Notice: Subject to any disclaimer, the term of this patent is extended or adjusted under 35 U.S.C. 154(b) by 8 days.

(21) Appl. No.: 15/493,206

(22) Filed: Apr. 21, 2017

(65) Prior Publication Data

US 2018/0307450 A1    Oct. 25, 2018

(51) Int. Cl.
*G06F 15/00*    (2006.01)
*G06F 3/12*    (2006.01)
*H04N 1/00*    (2006.01)

(52) U.S. Cl.
CPC .......... *G06F 3/1275* (2013.01); *G06F 3/1205* (2013.01); *G06F 3/1231* (2013.01); *G06F 3/1238* (2013.01); *G06F 3/1241* (2013.01); *G06F 3/1264* (2013.01); *H04N 1/00225* (2013.01); *H04N 1/00474* (2013.01); *H04N 1/00917* (2013.01); *H04N 2201/0094* (2013.01)

(58) Field of Classification Search
CPC .... G06F 3/1275; G06F 3/1205; G06F 3/1238; G06F 3/1241; G06F 3/1264; H04N 1/00474; H04N 1/00917; H04N 1/00225; H04N 2201/0094
USPC ....................................................... 358/1.14
See application file for complete search history.

(56) References Cited

U.S. PATENT DOCUMENTS

| 2007/0002392 A1* | 1/2007 | Ogura ............... H04N 1/00416 358/448 |
| 2007/0188772 A1* | 8/2007 | Davis .................. H04N 1/0035 358/1.1 |
| 2015/0215481 A1* | 7/2015 | Faust ................. H04N 1/00225 358/1.13 |

* cited by examiner

*Primary Examiner* — Saeid Ebrahimi Dehkordy

(57) ABSTRACT

The disclosure discloses methods and systems for integrating print and scan of a document at a multifunctional device. The multifunctional device receives a request to print and scan the document from a user device and creates a single job corresponding to the request to print and scan. The single job is assigned an identifier. The single job is executed partially by printing the document and is placed on hold until a manual scan request is received. The manual scan request for the document is received when a user selects the identifier of the single job displayed on a user interface of the multifunctional device. The processing of the single job is resumed by scanning the document by applying one or more predefined scan settings specified by the user using the user device. The scanned document is sent to an output destination indicated in the predefined scan settings.

19 Claims, 12 Drawing Sheets

METHODS AND SYSTEMS TO INTEGRATE DOCUMENT PRINTING AND SCANNING OPERATIONS

TECHNICAL FIELD

The presently disclosed embodiments relate to multifunctional devices, and more particularly to, systems and methods for integrating document printing and scanning operations.

BACKGROUND

The use of multifunctional devices (MFDs) has become more widespread in the recent years. While the origin of MFDs was essentially for large corporate setups, the devices are now being used in small business settings and even at homes. Typically, an MFD provides multiple functionalities, such as printing, scanning, copying, faxing—all incorporated in a single device. Employees or home users use the functionalities singularly or in combination. Examples of combination include, but are not limited to, copying a document and then faxing it, printing a document and finishing it (such as sorting, collating, stacking, stapling, binding, stitching, folding, cutting, and hole punching), and the like. For use of each functionality, a user provides individual requests corresponding to which separate job instructions are created. For example, in case of combining a copy request and a fax request for a document, the user provides a copy instruction on the MFD. The copy instruction may specify whether the document should be copied in color, grayscale or black and white, the number of copies to be created, the page layout, and the like. Next, the user provides a fax instruction (such as a fax number) on the MFD. For each case, the MFD creates two separate jobs: a first job to copy the document and a second job to fax it.

Similarly, if the user wants to print a document, make manual edits to it, and then scan it, he/she enters multiple instructions. First, the user provides a print request from a user device connected to the MFD over a wired or a wireless medium. The MFD creates a print job for the request and then prints the document. Next, the user collects the printed document, makes one or more edits to the printed document, and provides a scan request indicating one or more scan instructions. This scan request is either sent from the user device or is provided on the MFD itself (via a user interface of the MFD). The MFD creates a scan job for the scan request, such that the scan job is separate from the print job. Hence, there is no correlation between the print and scan jobs of same document. The correlation becomes necessary when the user or an administrator wants to track the MFD related activities. For example, in the current scenario, the administrator cannot monitor what activities are performed on which documents unless the activities are tracked and tied together. Further, the user needs to provide individual instructions (print/scan/copy) at separate instances and this activity is time consuming. Consider a scenario where a user has to send a completed official document (such as a visa request document, a tax related document, a passport related document, and the like) to a concerned authority over an email. In a soft copy of a standard unfilled official document, the user first digitally inputs all the required fields (using a user device), and then initiates a print request by specifying one or more print settings. Next, he/she collects the print of the filled document, provides his signature or thumb impression, and manually scans the signed document using the MFD. The user may also take print of the unfilled document, write all details by hand, provide a signature/thumb impression, and then scan the document. The user needs to provide the scan settings on the MFD itself and also needs to provide the email address of the concerned authority to whom the scanned document is to be emailed. In other words, the user must memorize the email address (i.e., any email address other than his own) and also the required scan settings in order to manually provide instructions on the MFD prior to initiating a document scan. This process is time consuming and not user friendly.

Therefore, there exists a need for integrating a print request and a scan request such that print and scan operations are mutually related at the MFD.

SUMMARY

The present disclosure discloses a computer-implemented method for integrating print and scan of a document, the method being performed by a multifunctional device. A request to print and scan the document is received at the multifunctional device, the request being received from a user device. A single job is created corresponding to the request to print and scan, the single job being added to a queue, the single job being assigned an identifier. The single job is executed partially by printing the document. The single job is placed on hold until a subsequent manual scan request is received. Next, the manual scan request for the document is received, the manual scan request being received when a user selects the identifier of the single job displayed on a user interface of the multifunctional device. The processing of the single job is resumed by scanning the document, wherein the document is scanned by applying one or more predefined scan settings. Thereafter, the single job is removed from the queue.

The present disclosure discloses a method for initiating a combined print and scan request for a document at a user device, the method being performed by a printer driver at the user device, the printer driver being associated with a multifunctional device. The printer driver receives a request to print a document and identifies whether a user selects a print and scan option, the selection being made by the user at the user device. A scan setting window is displayed to the user when the print and scan option is selected. One or more scan settings are received from the user in the scan setting window. Further, a combined print and scan request is created for the document, wherein the combined request includes the one or more scan settings. Thereafter, the combined print and scan request is sent to the multifunctional device for processing.

Moreover, the present disclosure discloses a printing and scanning integrator (PSI) module for executing a combined print and scan operation of a document, the PSI module being integrated with a multifunctional device. The PSI module includes a request analyser, a job integrator, a tracking module and a PSI memory. The request analyser is configured to receive a request to print and scan the document, the request being received from a user device. The job integrator is configured to create a single job corresponding to the request to print and scan, the single job being added to a queue. The tracking module is configured to place the single job on hold after a printer engine of the multifunctional device prints the document, and mark the single job as completed when a scan module of the multifunctional device scans the document, the scan being performed after the document is printed. The PSI memory is configured to store the single job.

The present disclosure discloses a multifunctional device for executing a combined print and scan operation of a document. The multifunctional device includes a printing and scanning integrator (PSI) module, a printer engine, a scan module, a user interface module, a security module and a memory module. The PSI module is configured to receive a request to print and scan the document, the request being received from a user device; create a single job corresponding to the request to print and scan, the single job being added to a queue; place the single job on hold after the document is printed; and mark the single job as completed when the document is scanned, the scan being performed after the document is printed. The printer engine is configured to print the document. The scan module is configured to scan the document and send the document to at least one of a predefined folder on the user device, a predefined folder on an external memory drive connected to the user device, a predefined folder on a server, and one or more email addresses. The user interface module is configured to execute a plurality of interactions with a user. The security module is configured to implement an authentication scheme when the user accesses the single job on the user interface module, the authentication scheme includes at least one of a password verification, an access card verification, and a biometric verification. The memory module is configured to store the single job, one or more print settings, and one or more scan settings, wherein the one or more print settings and the one or more scan settings are indicated in the request to print and scan.

The present disclosure also discloses a printer driver configured to initiate a combined print and scan request for a document at a user device, the printer driver being executed on the user device, the printer driver being associated with a multifunctional device. The printer driver is configured to receive a request to print a document and identify whether a user selects a print and scan option for the document, the selection being made by the user at the user device. Further, the printer driver displays a scan setting window to the user, when the user selects the print and scan option. One or more scan settings are received from the user in the scan setting window. A combined print and scan request is created for the document, wherein the combined request includes the one or more scan settings and the combined print and scan request is sent to the multifunctional device for processing.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
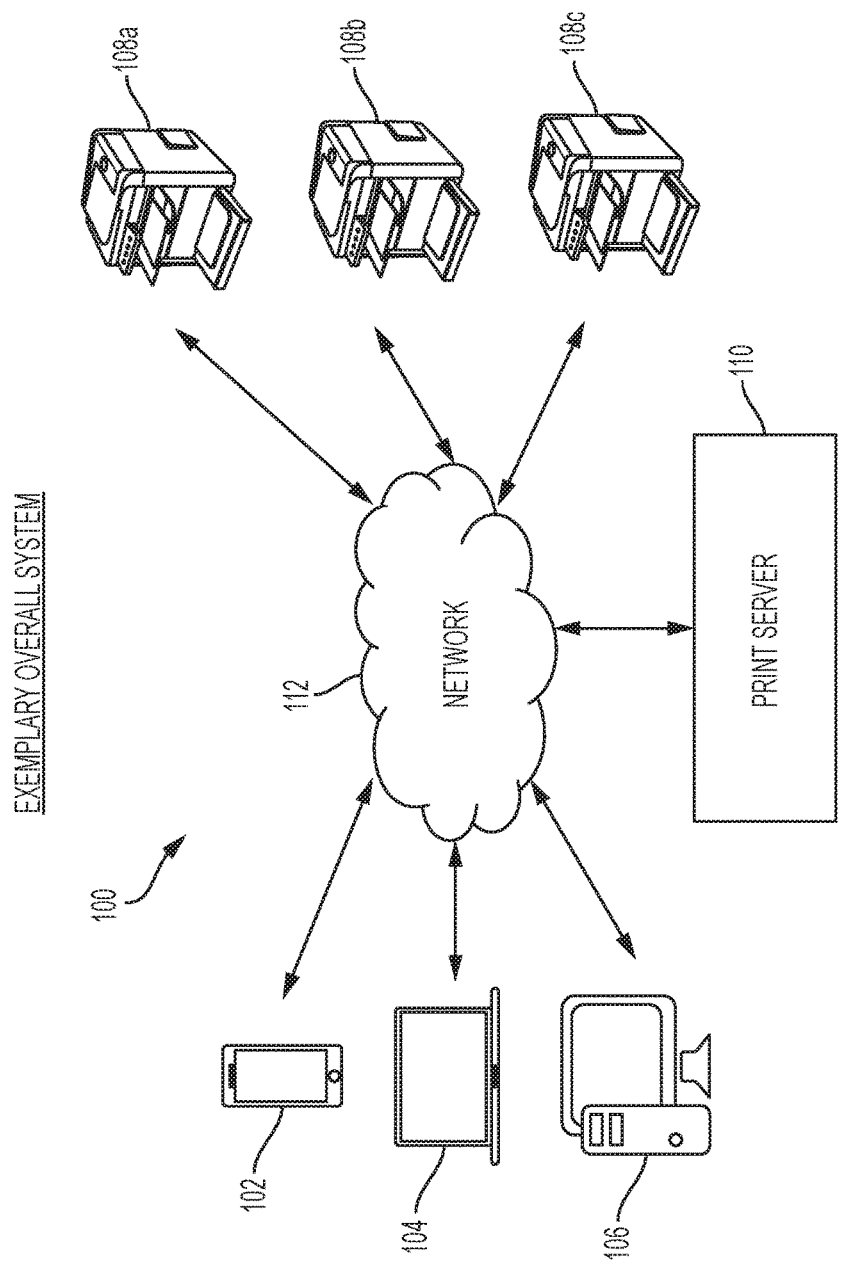
FIG. 1 illustrates an exemplary overall system configured for integrating a print and scan operation of a document, according to an aspect of the disclosure.

The following detailed description is provided with reference to the figures. Exemplary, and in some cases preferred, embodiments are described to illustrate the disclosure, not to limit its scope, which is defined by the claims. Those of ordinary skill in the art will recognize a number of equivalent variations in the description that follows without departing from the scope and spirit of the disclosure.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "document" relates to a content that is in an electronic format that includes at least one electronic page. The document can be printed, scanned, copied, or faxed as an output. The document may correspond to any file format. Examples include, but are not limited to, PDF, HTML, PostScript, RTF, GIF, JPEG, TXT, DOC, DOCX, EPUB, PPT, PPTX, XLS, XLSX, Numbers, Pages, Keynote, and the like.

The term "multifunctional device" (MFD) refers to a single device that performs multiple separate functionalities, such as printing, scanning, copying, and faxing a document. The multifunctional device may participate in a network and communicate with various devices, users, or any combination thereof. In the context of the present disclosure, the multifunctional device manages a request for printing and scanning the same document as a single job.

A "user device" refers to a device that includes a processor/micro-controller and/or any other electronic component, or a device or a system that performs one or more operations according to one or more programming instructions. Examples of the user device include, but are not limited to, a desktop computer, a laptop, a personal digital assistant (PDA), a mobile phone, a smart-phone, a tablet computer, and the like. In the context of the present disclosure, the user device enables the user to send a single/combined request for printing and scanning of the same document.

A "user" is an individual who operates the user device and the multifunctional device to perform specific functions. Examples of specific functions include, but are not limited to, initiating a print and scan command on the user device, providing print settings and scan settings from the user device, manually editing a printed document, placing the printed document on a platen, a scanner glass, in a document feeder slot, or in an automatic document feeder (ADF) of the multifunctional device to trigger a scan operation, initiating a copy or fax command, and the like.

A "print job" refers to a set of one or more documents, each having one or more electronic pages, subjected to printing. Further, a "scan job" refers to the same set of one or more documents, subjected to scanning. In context of the present disclosure, a "single job" refers to a combined print and scan job. In other words, a single job is deemed complete only when the one or more documents are printed and then scanned. Further, the print and scan operations of the documents may or may not be synchronous, i.e., there may be a time difference between initiation and completion of a print operation and the scan operation. However, both operations correspond to a single job entry on the MFD (irrespective of when initiated or completed).

A "Printing and Scanning Integrator module" (PSI module) is a device that executes one or more machine readable program instructions to process a combined print and scan request. The PSI module is configured to be integrated with the MFD. In another embodiment of the disclosure, the PSI module resides on a server and remotely monitors the print and scan operations performed at one or more MFDs connected over a network. More details will be discussed in conjunction with FIG. 2 and FIG. 3.

A "printer driver" is a software that runs on the user device and converts data to be printed/scanned into a format acceptable by the MFD. The printer driver provides a plurality of control commands to the user to customize the printing/scanning of a document by specifying one or more print and scan settings. Accordingly, the document is fed to the MFD along with the selected print and scan settings.

Overview

Various embodiments of the present disclosure describe systems and methods for integrating a print and scan request into a single job on a multifunctional device (MFD). The MFD is configured to receive a combined request to print and scan the document, such that the request is provided by a user using a user device. The MFD creates a single job for the combined request, assigns an identifier to the single job, and places the single job in a queue. The identifier of the single job is displayed on a panel on the MFD. The MFD then prints the document and puts the single job on hold until a subsequent manual scan request is received from the user. When the user places the printed document on a platen (or an equivalent medium) and selects the identifier of the single job from the MFD's panel, the MFD scans the document by applying one or more scan settings previously specified by the user. In an embodiment of the disclosure, the MFD instructs the user to authenticate himself/herself by at least one of a password verification, an access card verification, or a biometric check. Once the document is scanned, the MFD sends the scanned document to an output destination specified in the one or more scan settings. Thereafter, the MFD flags the single job as completed and removes it from the queue.

Exemplary Overall System

FIG. 1 illustrates an exemplary environment 100 in which various embodiments of the disclosure can be practiced. The environment 100 includes a plurality of user devices (102, 104, 106), a plurality of multifunctional devices (108a, 108b, 108c), and a print server 110—each connected over a network 112. The user devices (102-106) may correspond to a desktop PC, a laptop, a workstation, a personal digital assistant, a mobile phone, a tablet, a server, and the like.

The print server 110 installs a printer driver on each of the plurality of user devices. Further, the print server 110 keeps the printer drivers updated on the user devices (102, 104, 106). In other words, when a new MFD is added or removed, its corresponding printer driver is automatically installed or uninstalled on one or more of the user devices (102, 104, 106). While the addition/deletion of the printer driver can be done manually by a user of a user device such as the user device 106. The print server 110 is also configured to monitor the performance of all MFDs (108a, 108b, 108c).

The print server 110 may send regular software updates to the MFDs (108a, 108b, 108c), probe the MFDs to send their current status, remotely control or configure the MFDs, and the like.

The printer driver allows users to send a request to a multifunctional device (hereinafter referred to as an MFD). In the context of the current disclosure, the request is a combined request for printing and scanning of a document. The document may correspond to any file format, such as, but not limited to, PDF, HTML, RTF, GIF, JPEG, TXT, DOC, DOCX, PPT, PPTX, XLS, XLSX, and the like. After submitting the request, the printer driver allows the user to submit scan settings related to the document.

The network 112 may include any software, hardware, or computer applications that can provide a medium to exchange signals or data in any of the formats known in the art, related art, or developed later. The network 112 may include, for example, one or more of the Internet, Wide Area Networks (WANs), Local Area Networks (LANs), analog or digital wired and wireless telephone Networks (e.g., a PSTN, Integrated Services Digital Network (ISDN), a cellular network, and Digital Subscriber Line (xDSL), Wi-Fi, radio, television, cable, satellite, and/or any other delivery or tunneling mechanism for carrying data. The network 112 may include multiple networks or sub-networks, each of which may include a wired or wireless data pathway. The network 112 may include a circuit-switched voice network, a packet-switched data network, or any other network able to carry electronic communications. For example, the network 112 may include networks based on the Internet protocol (IP) or asynchronous transfer mode (ATM), and may support voice using, for example, VoIP, Voice-over-ATM, or other comparable protocols used for voice, video, and data communications.

System Modules

Figure 2:
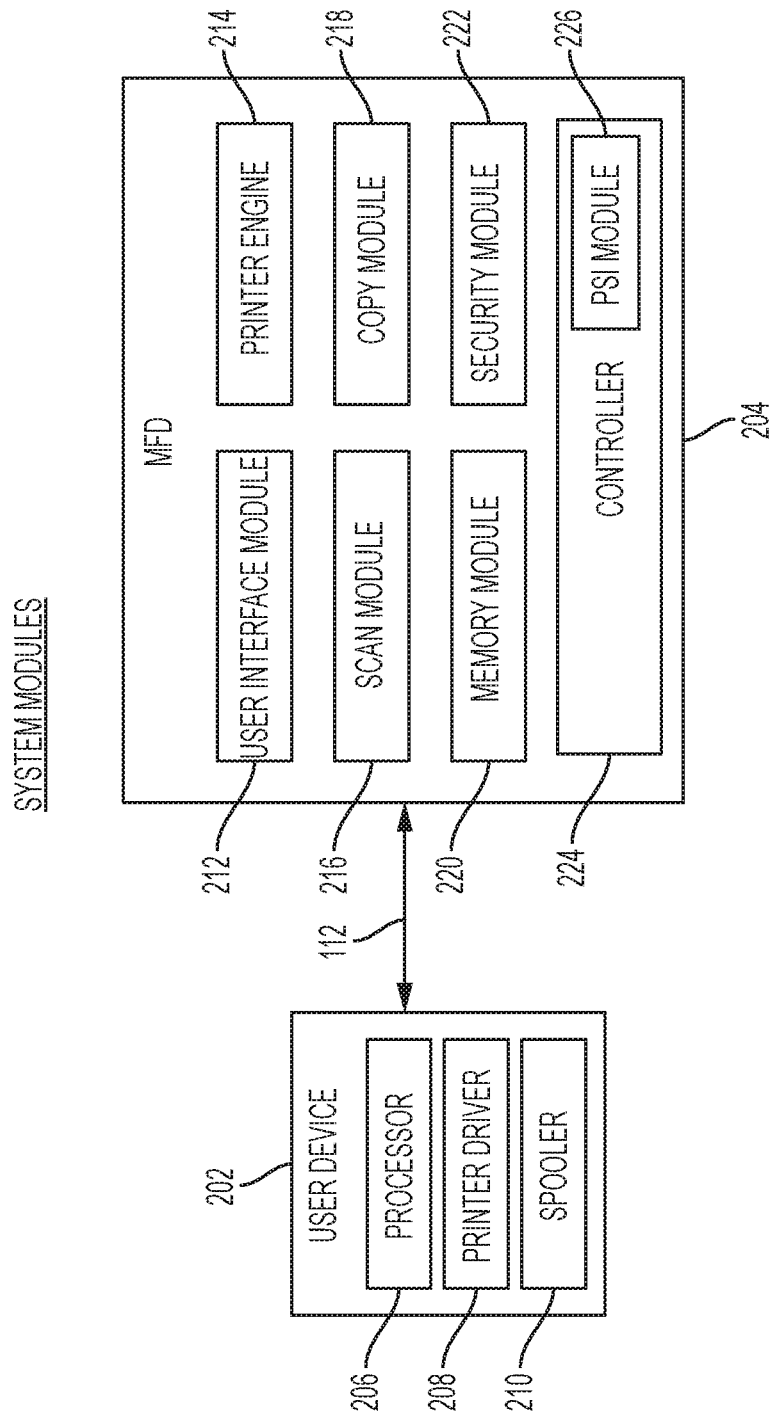
FIG. 2 illustrates a block diagram of a user device and a multifunctional device, according to an embodiment of the present disclosure.

FIG. 2 illustrates a block diagram of a user device 202 and a multifunction device (MFD) 204, according to an embodiment of the present disclosure. The MFD 204 is connected with a plurality of user devices, such as the user device 202, over the network 112. The user device 202 may also be connected to one or more multifunctional devices, other than the MFD 204 (not shown in FIG. 2). The user device 202 includes a processor 206, a printer driver 208, and a spooler 210. The processor 206 is configured to execute one or more machine readable program instructions to execute a plurality of application programs, convert electronic documents into electronic images (and vice versa), communicate a combined request of printing and scanning a document to an MFD (such as the MFD 204) over the network 112, and the like. Examples of the processor 206 may include, but are not limited to, microprocessors, microcomputers, microcontrollers, digital signal processors, central processing units, state machines, logic circuits, and/or any devices that can manipulate signals based on operational instructions.

The printer driver 208 is configured to generate a combined request of printing and scanning (including data, settings, and request related instructions) of a document. The printer driver 208 may be either universal or specific to the type of the MFD 204 and may be written in any programming language known in the art, related art, or developed later. Further, the spooler 210 is a software program which maintains an orderly sequence of print and scan requests at the user device 202 for being sequentially fed to the MFD 204. The spooler 210 is configured to temporarily buffer the print and scan request in an associated memory and queue them to be sent at a data rate that is synchronous with the rate of printing and scanning of the MFD 204. In an embodiment of the disclosure, the user device 202 may include a plurality of printer drivers and/or spoolers, each corresponding to one or more multifunctional devices.

The user device 202 also includes one or more interfaces (not shown in FIG. 2) using which the user initiates a print request and a scan request, and also indicates one or more instructions or settings associated with the printing and/or scanning. Examples of the one or more interfaces include a keyboard, a touch sensitive display, a mouse, and the like.

In the known solutions, a print request and a scan request are considered as two separate jobs on the multifunctional devices. When a user wants to print a document, a print request is initiated from a user device (after specifying one or more print settings from the user device) and is sent to the MFD. A print job is created at the MFD, the document is printed as per the one or more print settings, and the print job is closed (or marked as completed). Next, if the user wants to edit the printed document, he/she collects the printed copy from the MFD and makes one or more manual edits. Examples of the one or more manual edits include, but are not limited to, a text highlight, a text strikeout, a drawing highlight, an annotation, a signature, a thumb impression, and the like. If the user now wants to scan the edited document, he/she places the edited document on a platen, a scanner glass, in a document feeder slot, or in an automatic document feeder (ADF) of the MFD and inputs one or more scan settings on the MFD. In another scenario, the one or more scan settings are provided from the user device connected with the MFD over the network. In both the scenarios, a scan job is created at the MFD, the document is scanned, and the scan job is closed (or marked as completed). Therefore, there is no correlation between the print job and the scan job of the same document. The user has to provide the one or more print settings and the one or more scan settings separately and at different time, i.e., first the one or more print settings are provided based on which the document gets printed, and later the one or more scan settings are provided based on which the document gets scanned. Therefore, the user has to re-access the user device to provide the one or more scan settings after collecting the printed document, or has to enter the one or more scan settings on the MFD. This process is cumbersome. In a professional environment where a huge quantity of documents are printed and scanned on a regular basis, a user (such as an employee) needs to keep a track of what documents need to be scanned post printing and manual editing along with the respective settings, since the print and scan operations are not mutually associated for such cases.

Therefore, in accordance with the present disclosure, a correlation is established between print and scan operations by configuring the printer driver 208 to allow a user to initiate a combined print and scan request for a document. The combined request is generated via the printer driver 208 of the user device 202 and the combined request is processed by the multi-function device 204. The specifics of the combined print and scan request will now be discussed in conjunction with FIGS. 4A-4E.

Exemplary User Device Interfaces

Figure 4A:
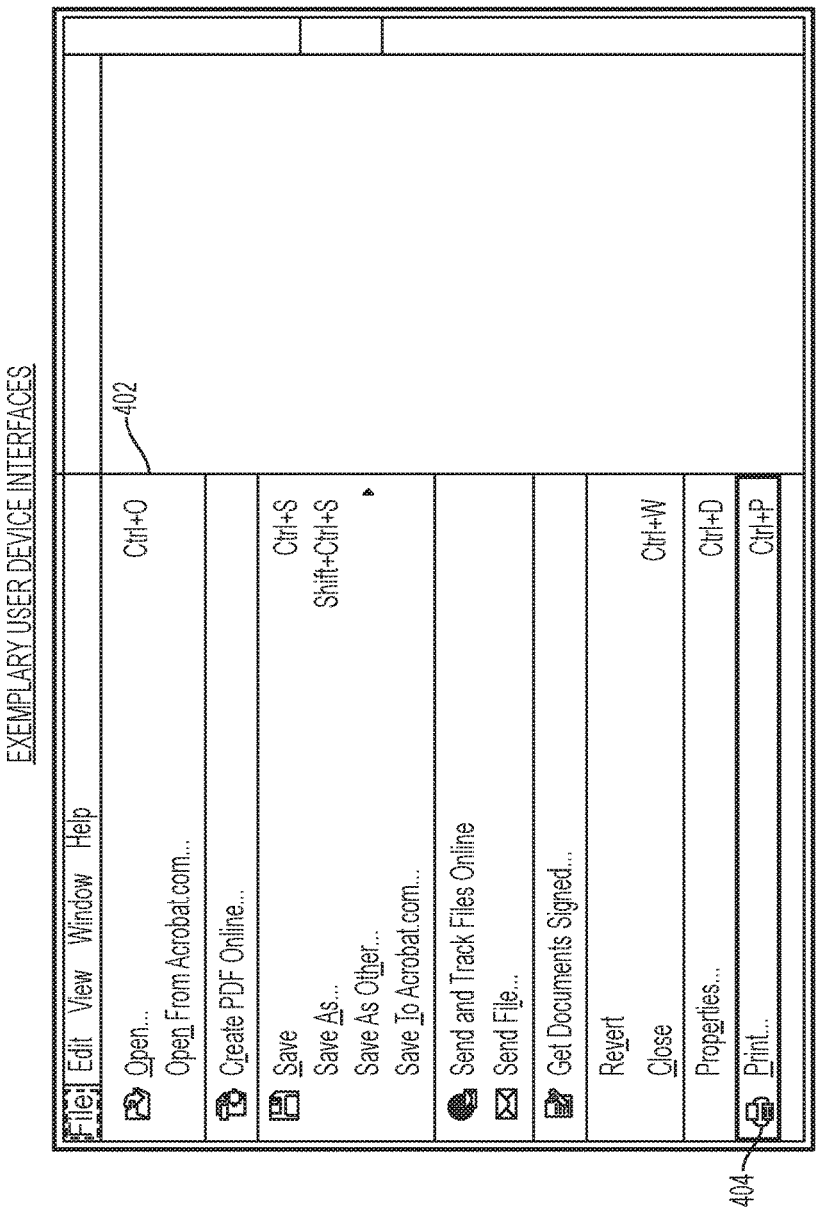
FIGS. 4A-4E illustrate exemplary user interfaces of a user device while submitting a print and scan request, according to an embodiment of the disclosure.

FIG. 4A illustrates a document of an application program 402 being executed on the user device 202. Examples of the application program 402 may include, but are not limited to, a word processor, a spreadsheet, an accounting application, a web browser, a media player, a photo editor, a PDF reader, and the like. The options to print and scan each document of the application program 402 are provided by the printer driver 208 of the user device 202. In an embodiment of the disclosure, a print option 404 is displayed on the application program 402. When the print option 404 is selected, one or more setting windows are displayed using which the user inputs one or more print and scan requests. In another embodiment of the disclosure, two separate options may be displayed—a print only option for generating print requests, and a print and scan option for generating a combined print and scan request.

Figure 4B:
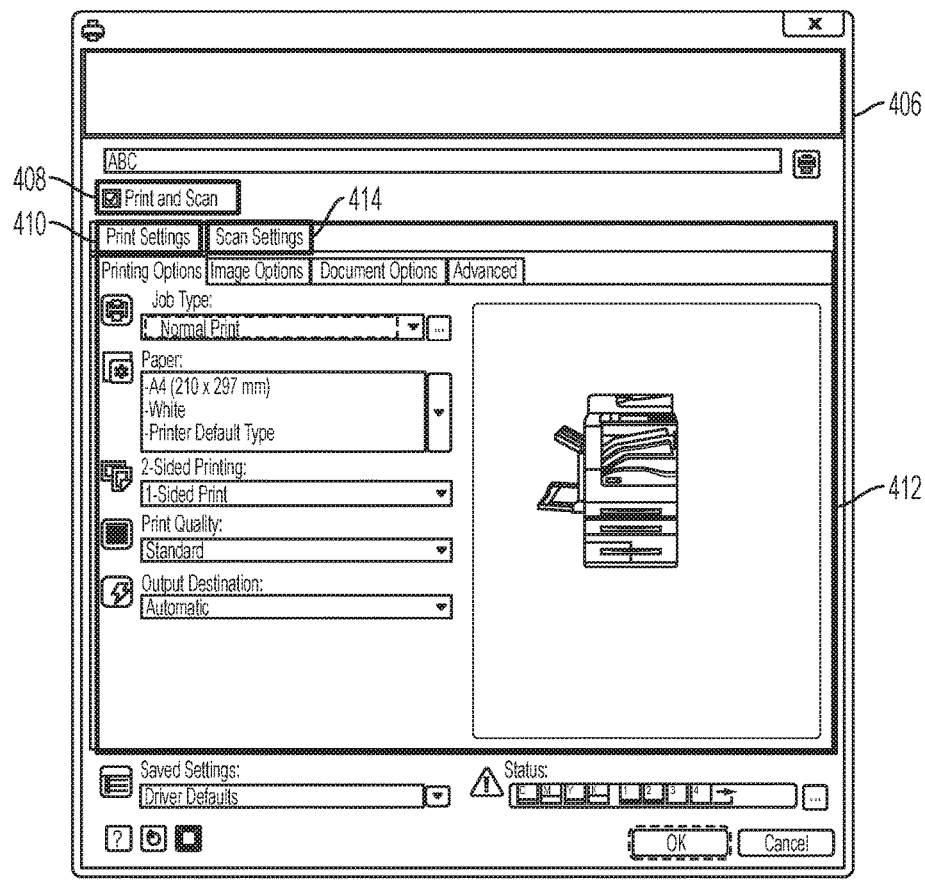

When a user selects the print option 404, in FIG. 4B, the printer driver 208 displays a properties window 406. The properties window 406 includes a plurality of fields, such as a name of the default MFD, one or more settings fields, previously saved settings, and the like. In accordance with the disclosure, the properties window 406 includes a print and scan option 408 using which the user specifies if the document needs to be scanned after being printed. If the user indicates that the document does not need to be scanned (indication being performed by marking a "no" in the print and scan option 408, deselecting a check box or a radio button, or by any other equivalent mode), the properties window 406 only displays a print settings tab 410 and its corresponding print settings window 412. The print settings window 412 provides a plurality of options to the user to indicate (or define) one or more print settings. Examples of the print settings include, but are not limited to, selecting a printer, identifying a printer location, specifying page numbers of the document to be printed, number of copies to be printed, a color mode (colored, black ink, greyscale, and the like), a paper type, a paper quality, one or two sided printing, a print layout (landscape or portrait), an output destination, and the like. Once the user inputs the one or more print settings, the printer driver 208 creates a print request, and sends it to the MFD 204.

Further, if the user indicates that the document is to be scanned after printing (indication being performed by marking a "yes" in the print and scan option 408, selecting a check box or a radio button, or by any other equivalent mode), the printer driver 208 displays the print settings tab 410 as well as a scan settings tab 414, using which the user inputs both one or more print settings and one or more scan settings in the context of the current disclosure. In an embodiment of the disclosure, the scan setting tab 414 is hidden when the user marks a "no" in the print and scan option 408. In another embodiment of the disclosure, the scan setting tab 414 may be displayed but greyed out.

Figure 4C:
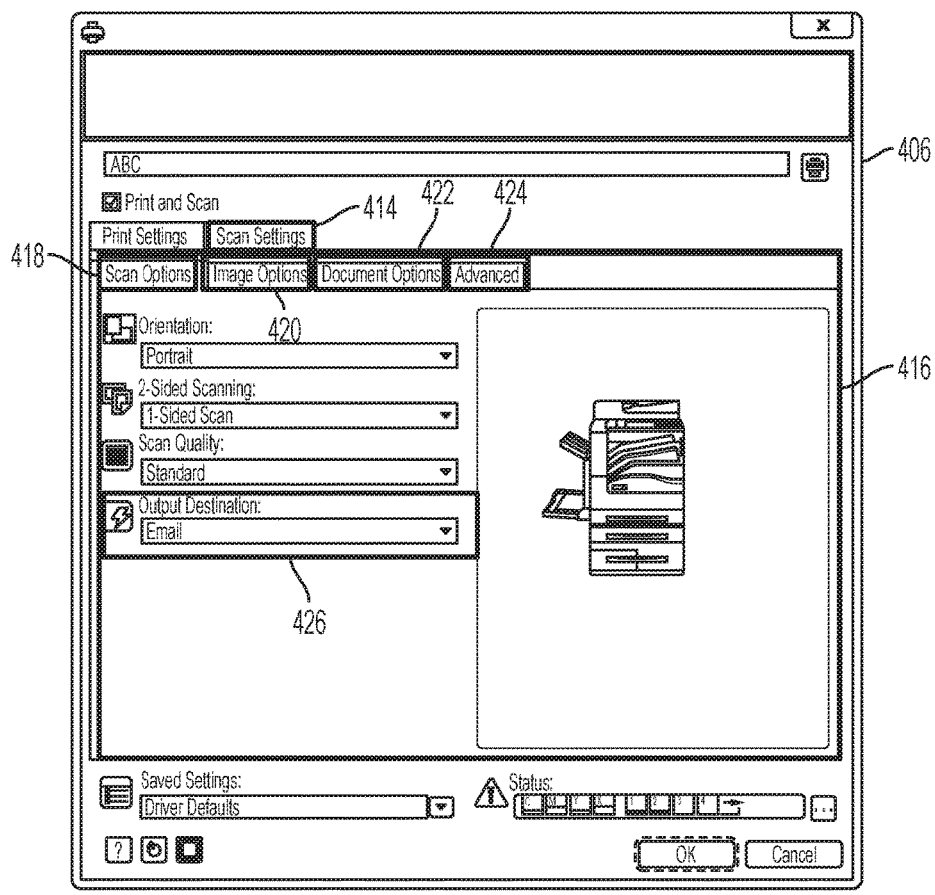

In FIG. 4C, when the user selects the scan setting tab 414, a scan setting window 416 is displayed which provides a plurality of options for the user to indicate (or define) the one or more scan settings. In an embodiment of the disclosure, the scan settings window 416 displays a scan options field 418, an image options field 420, a document options field 422, and an advanced field 424. When the scan options field 418 is selected, the user specifies a desired scan orientation, a scan quality, one or two sided scanning, and the like. In accordance with the disclosure, the user specifies the destination in an output destination field 426. The destination corresponds to the location where an image of the scanned document is to be transmitted by the MFD 204. Examples of the output destination include one or more email addresses, one or more folder locations on one or more user devices, one or more folder locations on an external memory drive (such as a USB flash drive, a hard drive, a memory chip, and the like) attached to the one or more user devices, and/or on or more folder locations on a server. In a scenario where the user specifies one or more email addresses, the MFD 204 sends the scanned document as an attachment to the one or more email addresses. The transmission is conducted over the network 112. Further, when one or more folder locations are specified in the output destination field 426, the MFD 204 sends the scanned document to the associated one or more user devices/external memory drives/server and saves the document in the specified folders. In an embodiment of the disclosure, the user specifies different values for different user devices in the output destination field 426. For example, the user can indicate that when a scan request is generated from a mobile phone, the scanned document may be sent to one or more email addresses. Further, when the scan request is generated from a laptop, the scanned document may be saved in a particular folder on the laptop and also emailed to a particular address. For a person skilled in the art, it is understood that multiple combinations of user devices and scanned document destinations are possible. The MFD 204 is configured to automatically detect the user device from which a print and scan request is initiated, such that the corresponding destination associated with the user device (as indicated in the one or more scan settings of the output destination field 426) is used to save the scanned document. In another embodiment of the disclosure, the user indicates default locations or email addresses in the output destination field 426, such that the MFD 204 adheres to the default locations or email addresses for transmission, unless the user provides new values in the output destination field 426.

Figure 4D:
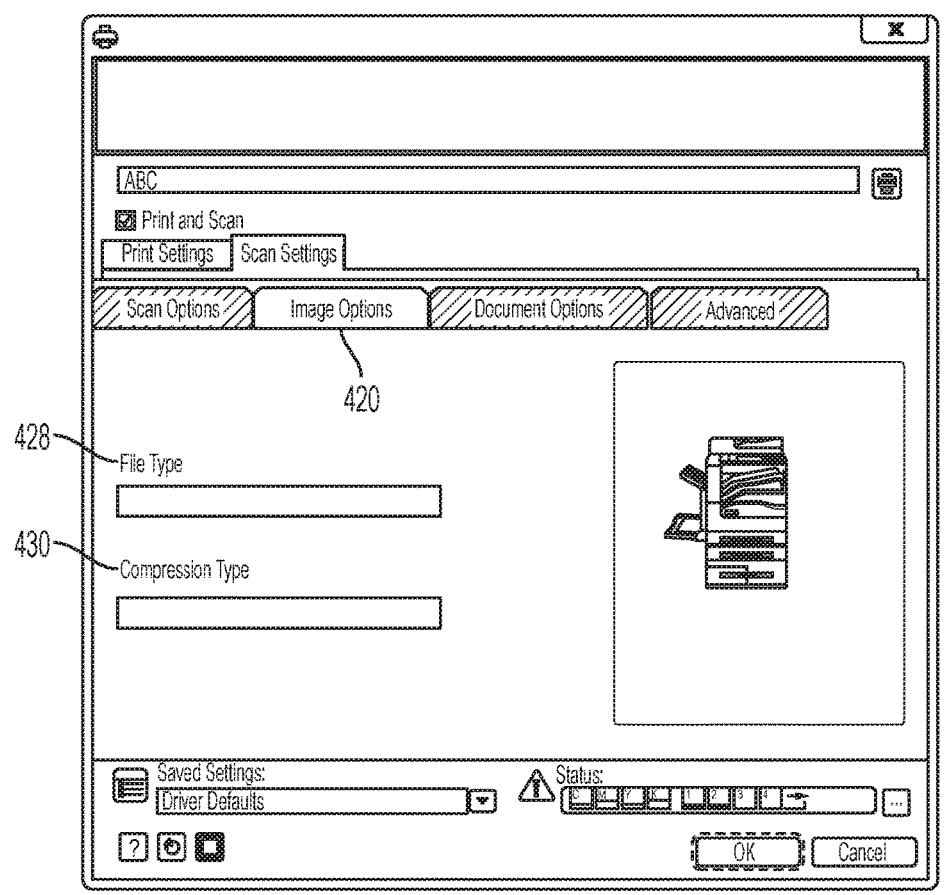

In FIG. 4D, when the user selects the image options field 420, a file type option 428 and a compression type option 430 are displayed. Using the file type option 428, the user specifies an electronic file format in which the scanned document is to be returned from the MFD 204. Examples of the file format include, but are not limited to, PDF, JPEG, GIF, Editable Text (OCR), and the like. Using the compression type option 430, the user indicates whether the scanned document is to be compressed before being transmitted from the MFD 204, and the compression schemes to be used.

Figure 4E:
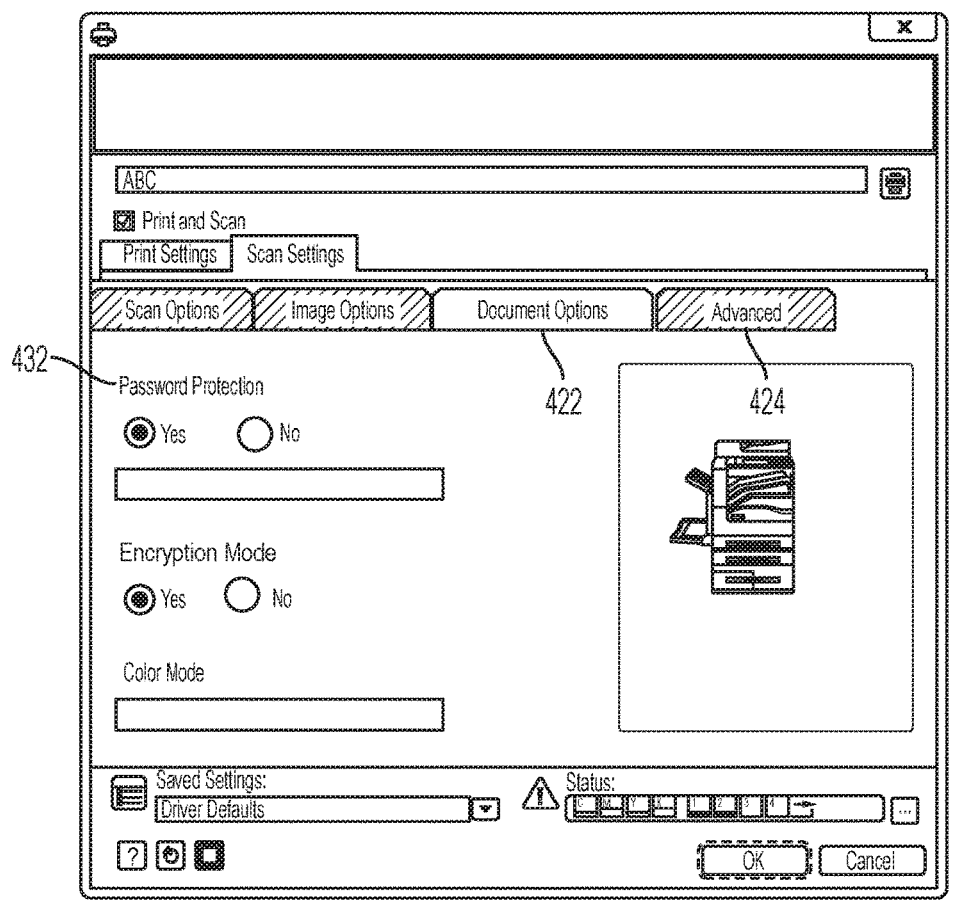

In FIG. 4E, when the user selects the document options field 422, a plurality of options are displayed. One such option is a password protection option 432 using which the user specifies an authentication requirement. If an authentication is required, the user sets a password for accessing the corresponding scan job on the MFD 204. The user provides a new password each time a scan request is initiated, or the user can set a default password. In an embodiment of the disclosure, the password protection option 432 is replaced by an access card verification option or a biometric verification option, such that the user has to only indicate a "yes" or a "no" for enabling or disabling the verification. If the access card or biometrics verification is enabled by the user, he/she must authenticate himself/herself using an authorized access card or via a biometric input at the MFD 204 before or during conducting the document scan operation. In another embodiment of the disclosure, the password protection, the access card verification or the biometric verification are also set for the printing activity. Other fields displayed when the document options field 422 is selected include enabling an encryption mode, setting a color more (colored, greyscale), specifying a scan size or a resolution, and the like. Further, additional options are displayed when the advanced option 424 is selected (not shown). An exemplary option in the advanced option 424 is a predefined threshold. The predefined threshold indicates a predefined time interval permitted between completion of a print operation and initiation of a scan operation. If the scan operation is not initiated within the specified predefined time interval from completion of the print operation, the scan operation is cancelled. The user can specify the predefined threshold/time interval in any unit, such as minutes, seconds, hours, or a specific date. Once the user has specified the desired scan settings, the printer driver 208 creates a combined print and scan request, and sends it to the MFD 204.

Referring back to FIG. 2, the MFD 204 is configured to perform a plurality of operations and provide these operations as a service to connected devices, such as the user device 202. Examples of these operations include copying or printing documents, scanning physical documents, encrypting or decrypting documents, embedding one or more digital signatures on files, emailing the documents, and the like.

In the context of the current disclosure, the MFD 204 receives the combined request (i.e., printing and scanning the document) from the printer driver 208 of the user device 202. The MFD 204 includes a user interface module 212, a printer engine 214, a scan module 216, a copy module 218, a memory module 220, a security module 222, and a controller 224.

Exemplary MFD Interface

Figure 5:
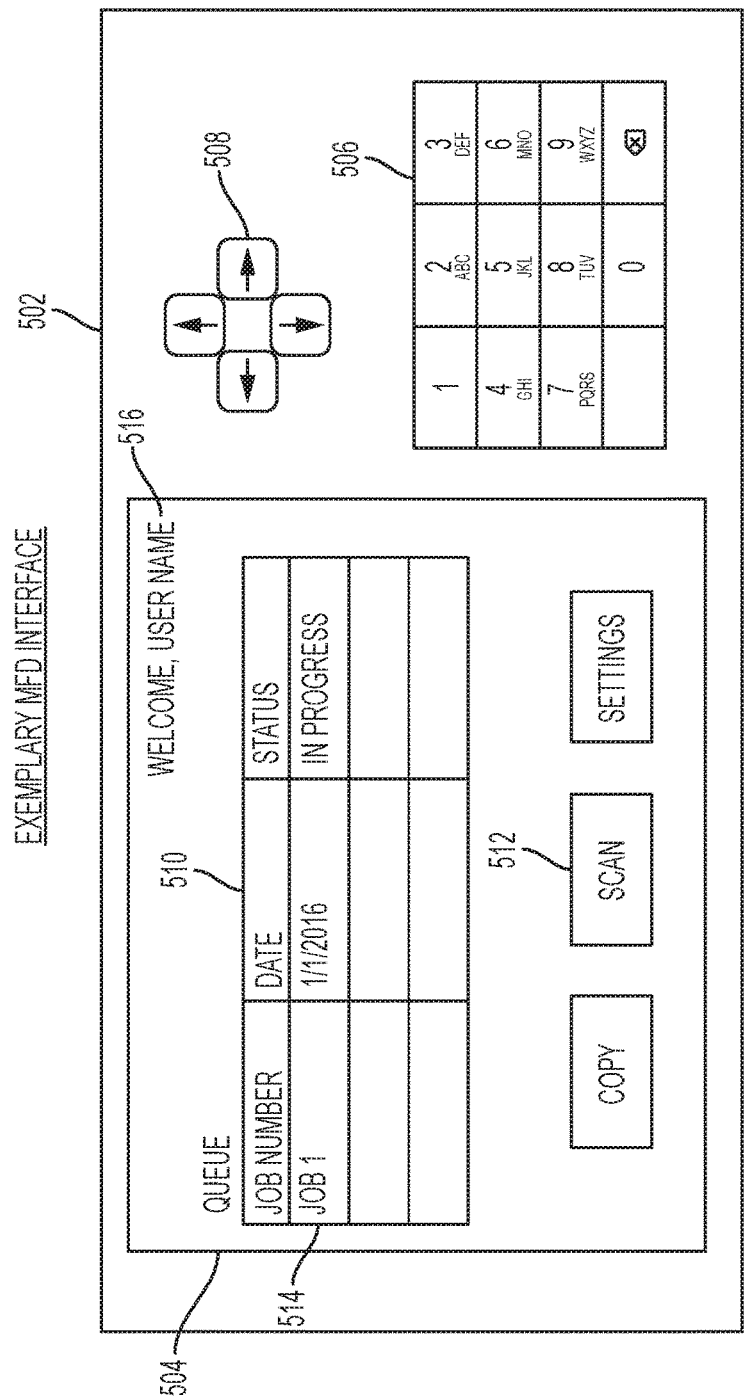
FIG. 5 illustrates an exemplary user interface of a multifunctional device, according to an embodiment of the disclosure.

The user interface module 212 of the MFD 204 will now be explained with reference to FIG. 5. The user interface module 212 is configured to execute plurality of interactions with a user. The user interface module 212 includes a panel 502 using which a user interacts with the MFD 204. The panel 502 can be operated by means of arrow keys 508, an alphanumeric/number keypad 506, or a touchscreen display 504. In an embodiment of the present disclosure, the arrow keys 508 and the alphanumeric/number keypad 506 are part of the touchscreen display 504. The user interface module 212 facilitates displaying a job status to a user, displaying one or more control commands, receiving one or more user selections corresponding to a print action, a copy action, or a scan action, receiving a user name and password, and the like. Further, a queue window 510 on the touchscreen display 504 includes one or more jobs identifiers (IDs) assigned by the MFD 204. In an embodiment of the disclosure, the one or more jobs identifiers may correspond to open, pending/in progress, and closed jobs. The queue window 510 displays the job identifiers, date/timestamp values of job generation, and a current status. The current status may be open, in progress, paused, rejected, error, or completed/closed. Other job related information may also be displayed in the queue window 510, such as number of pages, color mode, and the like.

Referring back to FIG. 2, the printer engine 214 of the MFD 204 is configured to execute a print job by printing a received document. The printer engine 214 may be any of various engines known in the art, related art, or developed later including those corresponding to a line printer that prints in units of one line, a serial printer that prints in units of one character (such as and ink jet printer or a heat transfer printer), a page printer that prints in page units (such as a laser printer), and the like.

The scan module 216 is configured to execute a scan job by scanning a physical document placed at a platen, a scanner glass, in a document feeder slot, or in an automatic document feeder (ADF) of the MFD 204. The scanned physical document is then sent to a desired location over a communication medium. For example, the scanned physical document may be emailed to a predefined user email address, or saved on a particular folder of a user device. The scan module 216 may correspond to a flatbed scanner, a drum scanner, a feed-through scanner, and the like. The copy module 218 is configured to execute a copy job to copy a physical document placed at a platen, a scanner glass, in a document feeder slot, or in an automatic document feeder (ADF) of the MFD 204.

The security module 222 is configured to implement a secured access to one or more jobs on the MFD 204. In an embodiment of the disclosure, the secured access is implemented using login credentials. A user inputs a user name and a password on the panel 502 of the MFD 204. Only when successfully authenticated, the user is allowed to operate the MFD 204. Once authenticated, a welcome message (or equivalent indicator) is displayed in a field 516 of the panel 502 (see FIG. 5). In another embodiment of the present disclosure, the MFD 204 may include a barcode or an access card reader, wherein a user brings an ID card in proximity to the reader for initiating an authentication activity. In yet another embodiment of the disclosure, the MFD 204 may include a biometric scanner which authenticates a user by finger print detection, voice/speech authentication, and the like. Further, the secured access can be tied to one or more operations on the MFD 204. For example, a user may be allowed to print or scan a document only when he/she is authenticated and/or logged-in, while a copy operation may be executed without the need of authentication. It should be evident to a person in the art that multiple combinations of the above secured access operations can be implemented.

The memory module 220 of the MFD 204 may include any computer-readable medium, for example, a processor or multiple processors operatively connected together, volatile memory (e.g., RAM), non-volatile memory (e.g., flash memory, etc.), disk drive, etc., or any combination thereof. The memory module 220 may include one or more databases with one or more schemas for storing print jobs, scan jobs, copy jobs, job queues, settings to be applied to print/scan/copy jobs, user name and passwords, and the like.

Each hardware and software module of the MFD 204 including the user interface module 212, the printer engine 214, the scan module 216, the copy module 218, the memory module 220, and the security module 222 are controlled by the controller 224. The controller 224 is configured to receive a request from a user, wherein the request is generated via a user device and received over the network 112, or is manually entered via the user interface module 212 of the MFD 204. The request may correspond to a print request, a scan request, or a copy request. The request is received in the form of high level commands or job related instructions, which are expressed in a page description language. The controller 224 interprets the received requests and creates one or more jobs. The controller 224 translates a data stream representing a job into a series of commands for directing the printer engine 214 to produce prints, the scan module 216 to scan a physical document, or the copy module 218 to copy a physical document. The controller 224 also handles a job queue of the received requests at the MFD 204. The job queue may include an instance or object of jobs that are sequentially arranged and buffered. The job queue is maintained in the memory module 220, which may be any suitable memory unit known in the art, related art, or developed later including those discussed above.

In accordance with the present disclosure, the controller 224 is configured to include a Printing and Scanning Integrator module 226 (hereinafter referred to as a PSI module 226). The PSI module 226 essentially combines a print request and a scan request for the same document into a single job. In an embodiment of the disclosure, the PSI module 226 may be hosted on a server (such as the print server 110 of FIG. 1, wherein it can remotely monitor the print and scan operations of one or more MFDs).

Figure 3:
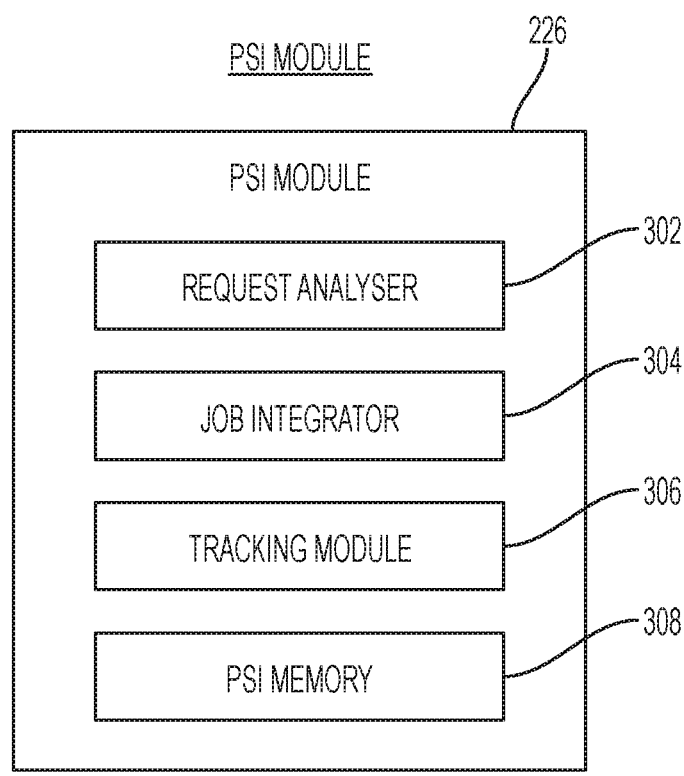
FIG. 3 illustrates the components of a PSI module, according to an embodiment of the present disclosure.

FIG. 3 illustrates the system components of the PSI module 226. The PSI module 226 includes a request analyser 302, a job integrator 304, a tracking module 306, and a PSI memory 308. The request analyser 302 analyzes all incoming requests on the MFD 204 to identify a combined print and scan request for a document. All standalone (independent) print requests and scan requests are processed as separate jobs, and accordingly a print or a scan operation is performed by the printer engine 214 or the scan module 216, respectively. For a combined print and scan request, the request analyser 302 activates the job integrator 304 which creates a single job (and assigns an identifier) and adds it to a queue in the memory. The memory may correspond to the PSI memory 308 or the memory module 220. In an embodiment of the disclosure, the request analyser 302 is also configured to extract one or more print and/or scan settings previously provided by the user using the user device 202. In addition, the request analyser 302 analyzes the received combined print and scan request to ascertain the device from which the request was generated. Accordingly, the print and scan settings are processed. For example, in FIG. 4C, a user may have indicated in the output destination field 426 that if a request is generated from a mobile phone, the scanned document should be sent to one or more email addresses. Accordingly, the request analyser 302 of the PSI module 226 examines the incoming request to identify if it was initiated from a mobile phone. The examination can be based on a machine identifier embedded within the request, an Internet Protocol (or equivalent protocol) address, or any other equivalent technique known in the art.

The tracking module 306 is configured to track the status of the single job and to keep it active until both print and scan operations have been performed by the MFD 204. In an embodiment of the disclosure, the print and scan operations may or may not be synchronous activities. In other words, the print operation and the scan operation may be performed at different time intervals, subject to a user's choice. Therefore, the tracking module 306 tracks the operations performed with the single job and marks it as complete/closed once both print and scan operations have been successfully executed. In an embodiment of the disclosure, a predefined threshold is assigned to the single job. The predefined threshold indicates a predefined time interval permitted between completion of a print operation and initiation of a scan operation. The tracking module 306 determines if the scan operation is not initiated (i.e., the user does not provide a manual scan request) before the allowable time interval lapses, the single job is marked as completed/closed. Accordingly, an error may be sent by the MFD 204 to the user device 202 indicating the failure to initiate the scan operation. The predefined threshold may be assigned by the user in the one or more scan settings while initiating the combined print and scan request from the user device 202. In such a scenario, different threshold may be applied to different combined print and scan requests. The user may also indicate the predefined threshold at the MFD 204 while collecting the printed documents (prior to initiating the scan). Alternatively, the predefined threshold may be preconfigured within the MFD 204.

The PSI memory 308 is configured to store one or more print settings and/or one of scan settings associated with the single job. In an embodiment of the disclosure, the PSI memory 308 may also store the job queue.

The primary aim of the methods and systems is to integrate printing and scanning operations of same document. To this end, the methods and systems enable a user to submit print and scan related settings via a user device. The methods and systems provide a user interface at the user device to submit the print and scan settings. At the printer end, the printer generates a single job request for printing and scanning the document so that a correlation is maintained between the printing and scanning. In this manner, the printer does not have to generate two different job requests for the same document.

Method Flowcharts

Figure 6:
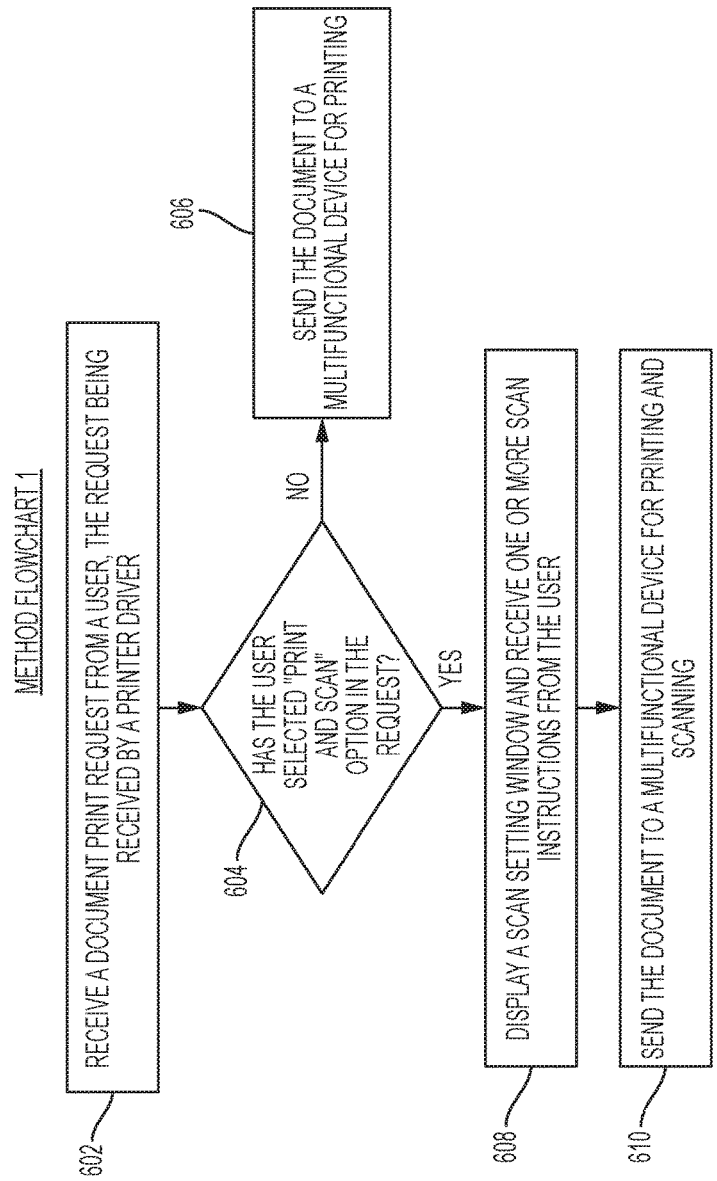
FIG. 6 illustrates a method for submitting a print and scan request via a user device, according to an embodiment of the disclosure.

FIG. 6 illustrates a method for accepting a print and scan request at the user device 202, according to an embodiment of the disclosure. At 602, the printer driver 208 of the user device 202 receives a document print request from a user. At 604, the printer driver 208 ascertains whether the user has selected the print and scan option 408 (see FIG. 4B). If the user has not selected the print and scan option 408, at 606, the printer driver 208 sends the document to the MFD 204 for a printing operation. However, if the user has selected the print and scan option 408, at 608, the printer driver 208 displays the scan setting window 416 and receives one or more scan settings from the user. The one or more scan settings may correspond to a file format, a compression type, an output destination, activation of password protection, a scan size, a color mode (colored, greyscale), a resolution, a predefined time interval, and the like. At 610, the printer driver 208 creates a combined print and scan request and sends the document to the MFD 204 for printing and scanning.

Figure 7A:
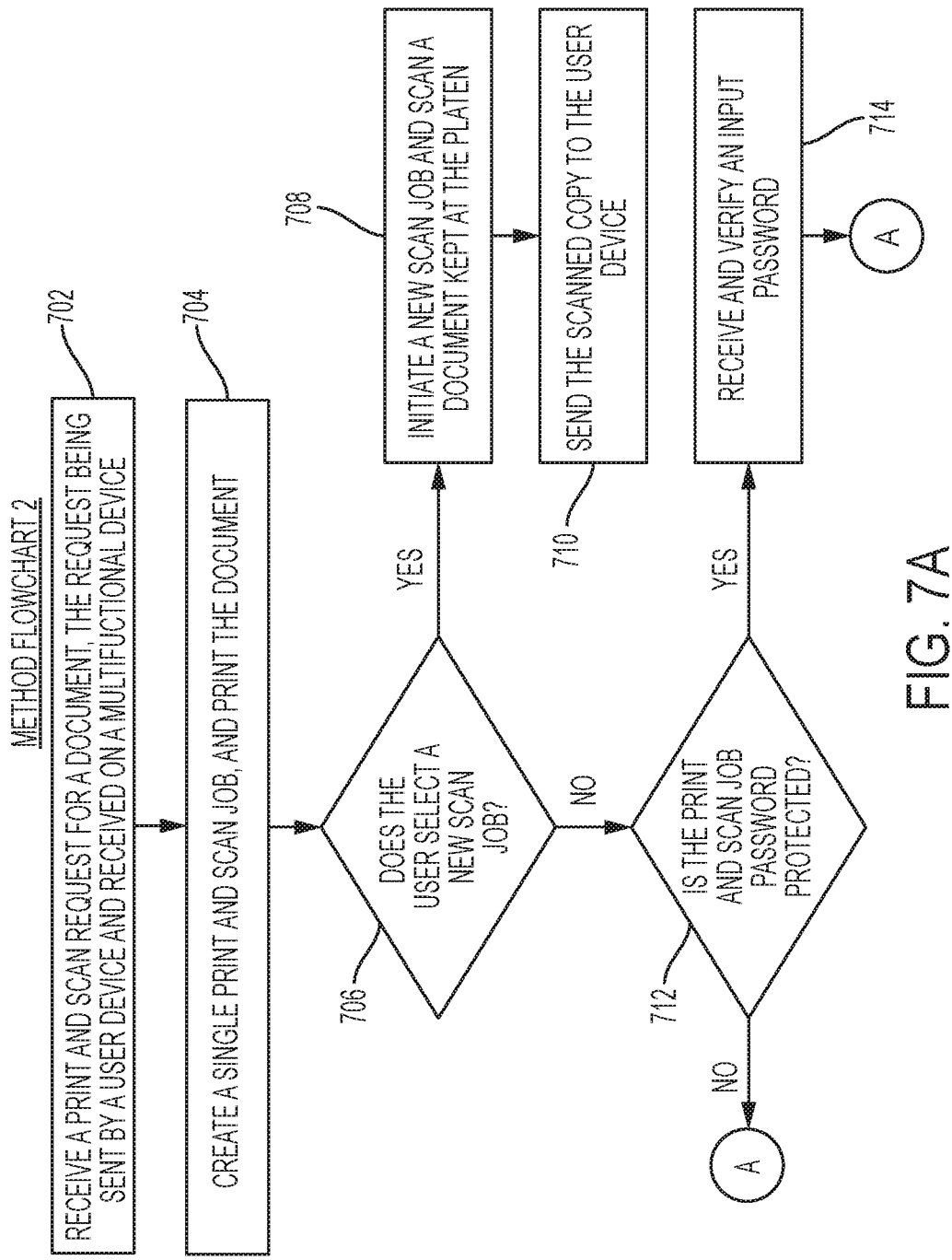
FIGS. 7A-7B illustrate a method for executing a combined print and scan operation of a document at a multifunctional device, according to an embodiment of the disclosure.
Figure 7B:
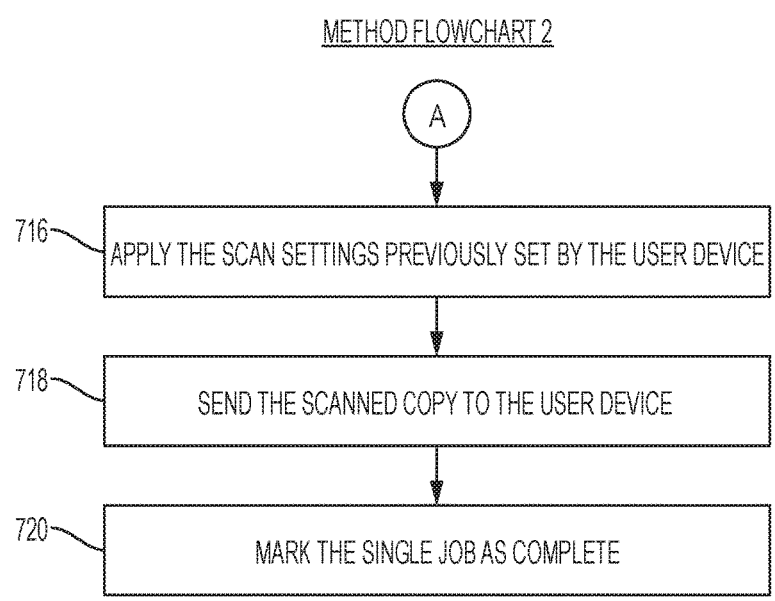

FIGS. 7A-7B illustrate a method for executing a combined print and scan operation at the MFD 204, according to an embodiment of the disclosure. At 702, the MFD 204 receives a print and scan request for a document, the request being received from the user device 202. The MFD 204 analyzes the request and extracts one or more print settings and/or one or more scan settings specified by the user. In an embodiment of the disclosure, the MFD 204 may also examine the request to identify the type of user device employed by the user to send the request. The type of user device may establish which one or more print/scan settings should be applied by the MFD 204. For example, the one or more scan settings may include different scan instructions for different user devices. The user may indicate that if the request is initiated from a mobile phone, the scan resolution should be 300 dpi, as opposed to 600 dpi for a laptop or a PC. Similarly, if the request is initiated from a laptop, only then the scanned document should be sent over an email. It should be apparent to a person skilled in the art that a plurality of combinations may be possible for the print or scan instructions/settings.

At 704, the MFD 204 creates a single job (and assigns a single job identifier) for the print and scan request. Next, the single job is partially executed by printing the document by applying the one or more print settings previously specified by the user on the user device 202. Examples of the one or more print settings include, but are not limited to, a color mode (colored, black ink, greyscale, and the like), a paper type, a paper quality, a print layout (landscape or portrait), and the like. In an embodiment of the disclosure, the document may be directly printed by the MFD 204 without a need for user's authentication. In another embodiment, the user may be required to first authenticate at the MFD 204. Only on successful authentication, the document is printed by the MFD 204. The authentication may be performed by entering a user name/password, by scanning an access card, or by any biometric scheme. In FIG. 5, the queue window 510 displays the jobs identifiers assigned by the MFD 204. The single job created at 704 is displayed in the queue window 510. As an example, a row 514 corresponds to the single job. Since the document is now printed by the MFD 204, but not yet scanned, the job status is indicated as "in progress" and not as "complete" (or any other equivalent phrase/terminology). Once the document is printed, the MFD 204 keeps the single job on hold and awaits user's further instructions on the scanning operation.

Referring back, once the document is printed, as a subsequent step the user collects the printed document from the MFD 204 and may proceed to perform one or more manual edits. Examples of the one or more manual edits include, but are not limited to, a text highlight, a text strikeout, a drawing highlight, an annotation, a signature, a thumb impression, and the like. The user may choose to scan the edited document either immediately or at a later point in time. Until the user resumes the scan operation, the MFD 204 puts the single job on hold.

When the user returns to the MFD 204 to resume the scan of the edited document, he/she places the document on a platen, a scanner glass, in a document feeder slot, or in an automatic document feeder (ADF). The MFD 204 displays a list of pending jobs to the user on the queue window 510 of the panel 502 for subsequent selection. The user either selects the single job identifier displayed on the queue window 510, or initiates a completely new scan request. If the user wants to initiate a new scan request which is separate from the previously combined print and scan request, he/she chooses a scan button 512 on the panel 502. In an embodiment of the disclosure, the user may manually provide one or more new scan settings on the panel 502. At 706, the MFD 204 examines that the user has provided a new scan selection. At 708, a new scan job (a separate job different from the single job) is created and added to a queue in the memory module 220 (or in the PSI memory 308). An identifier of the new scan job is then displayed on the queue window 510 of the panel 502. The new scan job is processed and the document is scanned. At 710, MFD 204 sends the scanned document to a user device indicated in the one or more new scan settings. In another embodiment of the disclosure, the MFD 204 may use default scan settings provided by the user at an earlier time.

However, if the user selects the single job identifier on the queue window 510 of the panel 502 (instead of initiating a new scan request), the selection triggers the MFD 204 to resume execution of the single job. Once the selection is received, at 712, the MFD 204 examines if the scan operation is password protected. The password protection scheme is identified from the one or more scan settings previously provided by the user while initiating the combined print and scan request from the user device 202. If the user had indicated password protection, at 714 the MFD 204 receives a password from the user. The password is manually entered on the alphanumeric or number keypad 506, or by using the touchscreen display 504. The password is verified, and at 716, the one or more scan settings are applied. Examples of the one or more scan settings include a scan size, a color mode (colored, greyscale), a resolution, and the like. In an embodiment of the disclosure, the password protection scheme may be replaced by an access card verification or a biometric verification. In another embodiment, the user may be required to authenticate himself/herself before selecting any job identifier on the panel 502. In other words, when the user places any document on the platen (or other mediums) of the MFD 204, he/she is first required to authenticate himself/herself. Only once successfully authenticated, the user can either select a single job ID, or initiate a new scan request.

When the document is scanned by the MFD 204, at 718, the scanned document is sent to an output destination that indicates at least one of a predefined folder on the user device, a predefined folder on an external memory drive connected to the user device, a predefined folder on a server, and one or more email addresses. This decision is made based on output destination specified in the previously provided one or more scan settings. In an embodiment of the disclosure, before scanning the document, the MFD 204 displays the one or more scan settings on the panel 502 to the user for confirmation. The user may make changes to the one or more scan settings. Finally, at 720, the MFD 204 marks the single job as complete (or closed), since both print and scan operations for the same document are now finished. Further, the single job is removed from the queue in the memory module 220 (or the PSI module 308).

The present disclosure discloses methods and systems for integrating a print and a scan operation of a common document. A PSI module of a multifunctional device creates a single job corresponding to the integrated print and scan operation, such that the single job indicates that the print and scan operations are mutually relatable with respect to a document. The single job is kept open until both print and scan operations have been successfully performed. The present disclosure simplifies the steps of providing user input. A user can avail more than one functionalities of the multifunctional device. For example, a combined printing and scanning, wherein the user can provide both print and scan settings from a user device at a single instance, thereby saving time. The user is not required to provide separate print settings and scan settings at the multifunctional device or at a user device. Further, the user can keep a track of all activities performed on the same document, wherein the activities correspond to printing, scanning, copying, and/or faxing.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for integrating operations of printing and scanning of a document, the method being performed by a multifunctional device, the method comprising:
    receiving, at the multifunctional device, a combined request to print and scan the document, the combined request being received from a user device;
    creating a single job corresponding to the combined request to print and scan the same document, the single job being added to a queue, the single job being assigned an identifier;
    executing the single job partially by printing the document;
    placing the single job on hold until a subsequent manual scan request is received;
    receiving the manual scan request for the same document, the manual scan request being received when a user selects the identifier of the single job displayed on a user interface of the multifunctional device;
    resuming processing the single job by scanning the same document, wherein the same document is scanned by applying one or more predefined scan settings; and
    removing the single job from the queue,
    wherein the print and scan operations are mutually relatable with respect to the document.

2. The computer-implemented method of claim 1, wherein the user performs one or more manual edits to the printed document before initiating the manual scan request.

3. The computer-implemented method of claim 2, wherein the one or more manual edits comprise at least one of a text highlight, a text strikeout, a drawing highlight, an annotation, a signature, and a thumb impression.

4. The computer-implemented method of claim 1, wherein the one or more predefined scan settings are input by the user on the user device while initiating the combined request to print and scan.

5. The computer-implemented method of claim 1, wherein the one or more predefined scan settings indicate at least one of: an output destination and an authentication requirement.

6. The computer-implemented method of claim 5, wherein the output destination corresponds to a location for sending or saving the scanned document, the output destination being at least one of a predefined folder on the user device, a predefined folder on an external memory drive connected to the user device, a predefined folder on a server, and one or more email addresses.

7. The computer-implemented method of claim 1, wherein the manual scan request is initiated at a later time period.

8. The computer-implemented method of claim 1, wherein the user device comprises at least one of a stand-alone desktop, a laptop, a mobile phone, and a portable device.

9. The computer-implemented method of claim 1 further comprising receiving a new scan request from the user, the new scan request being different from the manual scan request associated with the single job.

10. The computer-implemented method of claim 9, wherein the multifunctional device scans the document as a separate job, wherein the separate job is different from the single job.

11. The computer-implemented method of claim 1, wherein the one or more scan settings comprise a predefined time interval, wherein the predefined time interval is calculated from the completion of the printing of document and receipt of the manual scan request, the single job being removed from the queue when the manual scan request is not received at the multifunctional device within the predefined time interval.

12. The computer-implemented method of claim 1, further comprising authenticating the user using at least one of a password verification, an access card verification, and a biometric verification, before initiating the manual scan request.

13. A computer-implemented method for initiating a combined print and scan request for a document at a user device, the method being performed by a printer driver at the user device, the printer driver being associated with a multifunctional device, the method comprising:
    receiving, at the printer driver, a request to print a document;
    identifying whether a user selects a print and scan option, the selection being made by the user at the user device;
    displaying a scan setting window to the user when the print and scan option is selected;
    receiving one or more scan settings from the user in the scan setting window;
    creating the combined print and scan request for the document, wherein the combined print and scan request includes the one or more scan settings; and
    sending the combined print and scan request to the multifunctional device for processing, wherein the print request and scan request are mutually relatable with respect to the document.

14. The computer-implemented method of claim 13, wherein the one or more scan settings indicate at least one of an output destination and an authentication requirement.

15. The computer-implemented method of claim 14, wherein the output destination corresponds to a location for sending or saving the scanned document, the output destination includes at least one of a predefined folder on the user device, a predefined folder on an external memory drive connected to the user device, a predefined folder on a server, and one or more email addresses.

16. The computer-implemented method of claim 13, wherein the user device comprises at least one of a stand-alone desktop, a laptop, and a portable device.

17. A printing and scanning integrator (PSI) module for executing a combined print and scan operation of a document, the PSI module being integrated with a multifunctional device, the PSI module to:
receive a combined request to print and scan the document, the request being received from a user device;
create a single job corresponding to the combined request to print and scan, the single job being added to a queue;
place the single job on hold after a printer engine of the multifunctional device prints the document;
mark the single job as completed when a scan module of the multifunctional device scans the document, the scan being performed after the document is printed; and
store the single job,
wherein the print and scan operations are mutually relatable with respect to the document.

18. The printing and scanning integrator (PSI) module of claim 17, wherein the PSI module further marks the single job as completed when the scan module does not initiate the scan of document within a predefined time interval from printing of the document by the printer engine.

19. A multifunctional device for executing a combined print and scan operation of a document, the multifunctional device comprising one or more processors to:
receive a combined request to print and scan the document, the request being received from a user device;
create a single job corresponding to the combined request to print and scan, the single job being added to a queue;
place the single job on hold after the document is printed;
mark the single job as completed when the document is scanned, the scan being performed after the document is printed;
print the document;
scan the document;
send the document to at least one of a predefined folder on the user device, a predefined folder on an external memory drive connected to the user device, a predefined folder on a server, and one or more email addresses;
execute a plurality of interactions with a user;
implement an authentication scheme when the user accesses the single job on the user interface module, the authentication scheme comprising at least one of a password verification, an access card verification, and a biometric verification; and
store the single job, one or more print settings, and one or more scan settings, wherein the one or more print settings and the one or more scan settings are indicated in the request to print and scan.

* * * * *